Dec. 21, 1926.
P. BAIA
1,611,402
TRANSMISSION MECHANISM
Filed Oct. 9, 1925  2 Sheets-Sheet 2
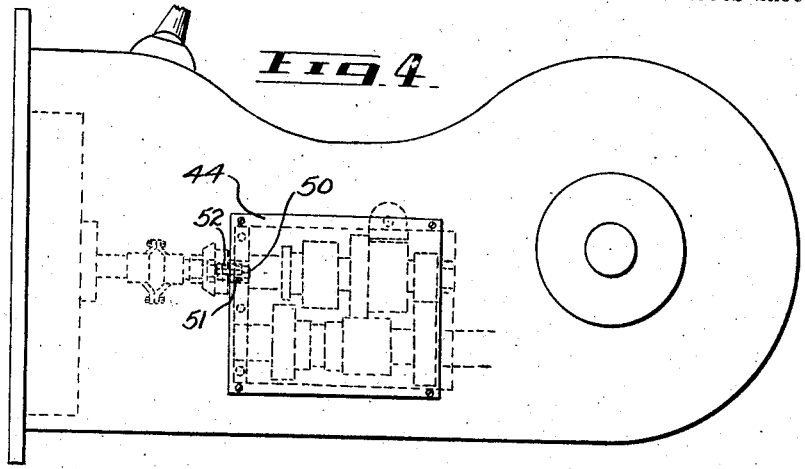
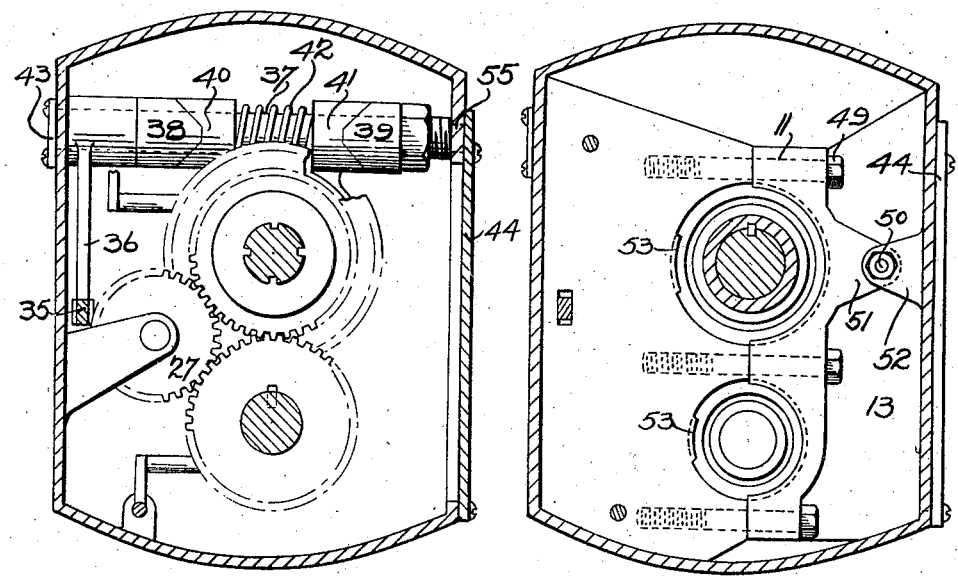
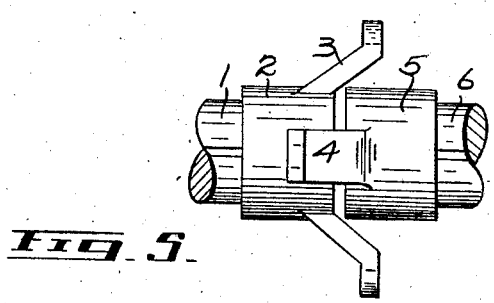
INVENTOR
Philip Baia
BY
Gerald F. Baldwin
ATTORNEY Patented Dec. 21, 1926.

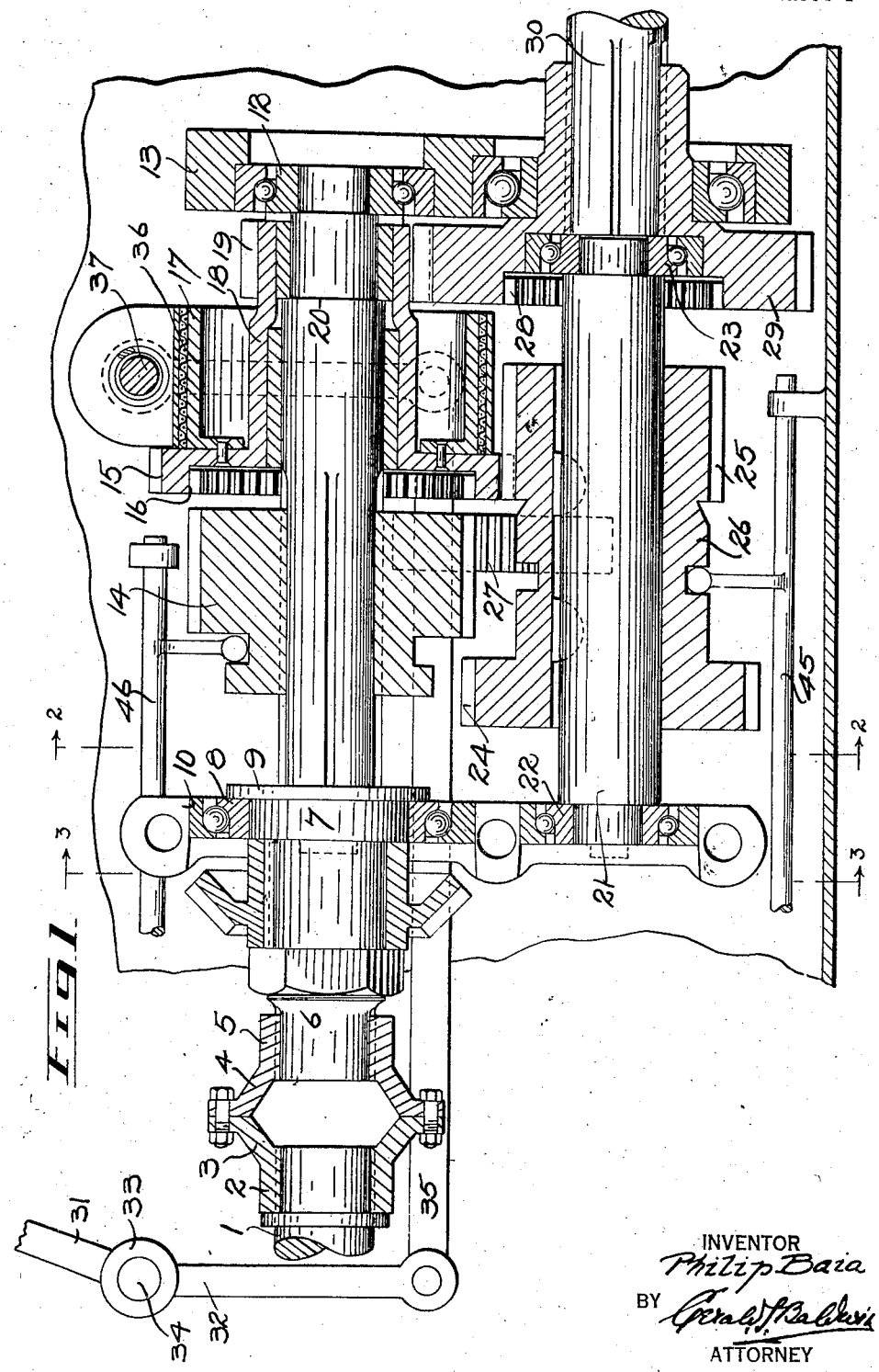

1,611,402

UNITED STATES PATENT OFFICE.

PHILIP BAIA, OF DETROIT, MICHIGAN.

TRANSMISSION MECHANISM.

Application filed October 9, 1925. Serial No. 61,394.

This invention relates to improvements in transmission mechanisms, and refers more particularly to transmissions for automotive vehicles.

At the present time in the forms of transmissions more generally in use it is necessary to dismantle a considerable amount of equipment before it is possible to remove either of the transmission shafts. This invention aims to provide a transmission mechanism wherein the upper transmission shaft is rigidly connected to the drive shaft and so supported that when the drive shaft connection has been disconnected it may be moved longitudinally and lifted out through an opening in the side of the housing with its gears as soon as a bearing cap within the housing has been removed. Moreover after the cap has been taken off the lower transmission shaft and its gears may also be lifted out. Thus the transmission mechanism can be taken apart and reassembled quickly and easily by anyone possessed of a minimum amount of mechanical knowledge.

Another object of the invention is to provide a transmission mechanism wherein only two gears are in mesh both high and intermediate speeds, and wherein no power is transmitted through the lower transmission shaft.

A further object of the invention is to provide a transmission mechanism having a brake drum secured to gears loosely mounted on the upper transmission shaft one of which gears is constantly in mesh with a fixed gear on the driven shaft, so that friction exerted on the brake drum will tend to stop the rotation of the driven shaft under all circumstances.

With these and other objects in view, the invention is hereinafter more fully described with the aid of the accompanying drawings and claimed.

Figure 1 illustrates a sectional view of the transmission mechanism.

Figure 2 is a section on the line 2—2 of Figure 1.

Figure 3 is a section on the line 3—3 of Figure 1.

Figure 4 shows a side elevation of the housing and the removable plate, and

Figure 5 is a detail.

Referring now to the drawings, 1 designates a drive shaft which terminates in a coupling 2 having outwardly disposed lugs 3. The latter are connected to outward lugs 4 integral with the coupling 5 on the upper transmission shaft 6. 7 indicates an enlarged portion of the shaft 6 around which the ball bearing 8 is placed, and 9 is a collar integral with the shaft which bears against one side of the ball bearing. The latter is supported by the bearing 10 integral with the inside of the housing and is provided with a removable cap 11. The opposite end of the upper transmission shaft is mounted in a ball bearing 12 supported by a solid bearing 13 integral with both sides of the housing.

The shaft 6 is splined for portion of its length, and has a gear 14 slidably mounted thereon. Towards the opposite end of the upper transmission shaft is a free gear 15 provided with an internal rack 16 which latter is adapted to mesh with the gear 14. The gear 15 also has a brake drum 17 secured thereto. 18 designates a hub by which the gear 15 is connected to the gear 19; the gears 15 and 19 are held in position on the shaft by the shoulder 20.

One end of the lower transmission shaft 21 rotates in a ball bearing 22 supported by the bearing 10, and the opposite end thereof is mounted in a ball bearing 23 positioned within a gear 29 secured to the driven shaft 30. Gears 24 and 25 connected by the hub 26 are preferably slidingly arranged on the shaft 21; the gear 25 is adapted to mesh either with the gear 15, the reverse idler 27, or the internal rack 28 of the gear 29, and the gear 24 with the gear 14. The gear 29 is constantly in mesh with the gear 19.

From the above it will be observed that the two gears 15 and 19 which are integral with one another, are free to revolve on the upper transmission shaft and always rotate as long as the driven shaft is turning. Secondly, no power is transmitted through the lower transmission shaft so that exactly the same result would be obtained by allowing the gears 24 and 25 to turn free on the shaft, in fact these gears may be loosely mounted on the shaft if desired. Thirdly, only one sliding gear is provided on the upper transmission shaft, and the latter is rigidly connected to the drive shaft.

44 designates a plate removable from the side of the housing. After the plate has been removed the bolts 49 in the cap 11 and the bolt 50 which passes through the lug 51 integral with the cap 11 and the lug 52 integral with the side of the housing are removed and the cap taken off. The lugs 3 and 4 of the coupling 2 and 5 are disconnected, one of the latter, together with the shaft on which it is secured, is then turned a quarter turn so that the coupling 5 may be moved towards the coupling 2 with their lugs 3 and 4 overlapping, as shown in Figure 5, sufficiently to allow the opposite end of the shaft 6 and its ball bearing 12 to come out of the bearing 13, then the whole shaft 6 and the gears thereon may be lifted out of the housing. After the cap 11 has been removed the lower transmission shaft may be raised sufficiently to permit the sides of the ball bearing 22 to clear the sides of the solid bearing 10, so that the opposite end of the shaft and its ball bearing 23 may be pulled out of the gear 29; that shaft is then free to be lifted out of the housing. It will be noted that the solid bearings 10 are provided with lips or projections 53 which only extend for a short distance round the bottom of the bore of the bearings; this construction lessens the height to which the shafts 6 and 21 must be raised for their ball bearings 8 and 22 to clear the solid bearings when being removed.

The method in which the various speeds are obtained is as follows:

For high speed the gear 14 cooperates with the gear 24 and the gear 25 engages the internal rack 28 of the gear 29.

For intermediate speed the gear 14 meshes with the internal rack 16, and the gear 19 drives the gear 29.

For slow speed the gear 14 drives the gear 24, the gear 25 cooperates with the gear 15, and the gear 19 actuates the gear 29.

For reverse the gear 14 through the reverse idler 27 drives the gear 25, the latter also meshes with the gear 15, and the gear 19 drives the gear 29.

The gear shifters 45 and 46 may be actuated by any suitable mechanism.

The arms 31 and 32 are united to a common boss 33 and turn about a pin 34, so that the arm 32 moves nearer to or further from the transmission mechanism, thereby moving the rod 35 longitudinally and causing the member 36 to swing on the shaft 37. The latter is usually provided with keys so that the member 36 and the cams 38 and 39 arranged thereon swing together. The cams are so arranged that as they turn they force the ends 40 and 41 of the brake band nearer together. 42 indicates a spring which tends to hold the brake band ends apart in released position. The shaft 37 is reduced at 55 so that a shoulder is formed which bears against the inside of the housing, and a retaining plate 43 is secured to the outer surface of the housing on the opposite side to hold the shaft 37 in position.

While in the foregoing the preferred embodiment of the invention has been described and shown it is understood that the construction is susceptible to such modifications as fall within the scope of the appended claims.

What I claim as my invention and desire to secure by Letters Patent is:

1. In a transmission mechanism, the combination of a transmission housing, a drive shaft, an upper transmission shaft rigidly connected thereto, a lower transmission shaft, a bearing having a removable cap integral with said housing, said bearing supporting one end of the lower transmission shaft and the upper transmission shaft towards one end, a solid bearing integral with said housing supporting the other end of the upper transmission shaft and a gear, a driven shaft on which said gear is fixed, the opposite end of the lower transmission shaft being supported within said gear, and gears mounted on the upper and lower transmission shafts.

2. In a transmission mechanism, the combination as described in claim 1, wherein the rigid connection between the drive shaft and the upper transmission shaft consists in couplings having outwardly extending lugs so placed that when disconnected the upper transmission shaft may be turned and pulled sufficiently towards the drive shaft to free the opposite end from the solid bearing.

3. In a transmission mechanism, the combination as described in claim 1, wherein a lug integral with the bearing cap is attached to a lug integral with the opposite side of the housing to that from which the bearing rises.

4. In a transmission mechanism, the combination of a drive shaft, an upper transmission shaft rigidly connected thereto, a lower transmission shaft, a driven shaft, a fixed gear on one end of said driven shaft in which one end of the lower transmission shaft is positioned, two gears loosely mounted on said upper transmission shaft and connected by a hub, one of said two gears being constantly in mesh with the gear on the driven shaft, one gear slidably mounted on said upper transmission shaft, two gears connected by a hub on the lower transmission shaft, an internal rack on one of the two gears on the upper transmission shaft adapted to be engaged by the slidable gear thereon, an internal rack in the gear on the driven shaft adapted to be engaged by one of the gears on the lower transmission shaft, said latter gear also being adapted to cooperate with one of the loosely mounted gears on the upper transmission shaft, and one of the gears on the lower transmission shaft also being adapted to coact with the sliable gear on the upper transmission shaft.

PHILIP BAIA.